(12) United States Patent
Váttement

(10) Patent No.: US 6,506,249 B1
(45) Date of Patent: *Jan. 14, 2003

(54) DELAYED-SETTING CONCRETE

(75) Inventor: Hubert Váttement, Montereau (FR)

(73) Assignee: Compagnie Du Sol, Nanterre (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/548,965

(22) Filed: Apr. 13, 2000

(30) Foreign Application Priority Data

Apr. 16, 1999 (FR) ............................. 99 04808

(51) Int. Cl.⁷ ................................. C04B 7/14
(52) U.S. Cl. ................. 106/789; 106/790; 106/791
(58) Field of Search ................ 106/789, 790, 106/791

(56) References Cited

U.S. PATENT DOCUMENTS

| | | | | | |
|---|---|---|---|---|---|
| 3,879,214 A | * | 4/1975 | Lowe et al. | ................ | 106/117 |
| 3,920,466 A | * | 11/1975 | Danjushevsky et al. | .... | 106/117 |
| 4,054,460 A | * | 10/1977 | Buchet et al. | ................ | 106/89 |
| 5,082,501 A | * | 1/1992 | Kurz | ........................... | 106/789 |
| 5,342,445 A | * | 8/1994 | Kiyomoto et al. | .......... | 106/789 |
| 5,447,197 A | | 9/1995 | Rae et al. | | |
| 5,593,493 A | * | 1/1997 | Krofchak | .................... | 106/714 |
| 5,749,962 A | * | 5/1998 | Krofchak | .................... | 106/714 |
| 5,882,375 A | * | 3/1999 | Edlinger et al. | ............ | 106/789 |

FOREIGN PATENT DOCUMENTS

| | | |
|---|---|---|
| DE | 3411009 | 9/1985 |
| EP | 0522347 | 1/1993 |
| EP | 0546699 | 6/1993 |

* cited by examiner

*Primary Examiner*—Elizabeth D. Wood
(74) *Attorney, Agent, or Firm*—Dennison, Schultz & Dougherty

(57) ABSTRACT

The invention relates to a delayed-setting concrete based on blast furnace slag. The invention further relates to a method of initiating the setting of said concrete.

11 Claims, 2 Drawing Sheets

DELAYED-SETTING CONCRETE

BACKGROUND OF THE INVENTION

The present invention relates to the building and construction sector. More precisely, the invention relates to a concrete whose setting is initiated after it has been poured, and to a method for initiating the setting of said concrete.

The concrete currently in use in special works has a rheology which is not adapted to the criteria for the preparation of deep foundations.

The major problem is the change in the rheology. In fact, the initial set time is very often shorter than the concreting time; this results in the production of structures in which the following are observed:

poor coating of the reinforcements, inclusions of drilling sludge, poor adhesion between the concrete and the reinforcements.

Attempts to modify these concretes with adjuvants do not easily make it possible, if at all, to attain the desired rheology, thereby limiting the volume of concrete pours and hence the efficiency.

SUMMARY OF THE INVENTION

The invention proposes to overcome these disadvantages by means of a concrete whose setting is initiated after it has been poured. Said concrete will hereafter be called "delayed-setting concrete".

Thus, according to a first feature, the invention relates to a delayed-setting concrete based on blast furnace slag.

Said concrete advantageously consists of a mixture essentially comprising a blast furnace slag, aggregates such as sand and/or coarse or fine gravels, and water.

The blast furnace slag generally represents from about 10% to about 35% by weight of the concrete composition. Although the nature of the blast furnace slag is not particularly critical, it is preferably of the basic type and the weight ratio $CaO/SiO_2$ is preferably between about 1.10 and about 1.35. As an example of slag which can be used within the framework of the present invention, there may be mentioned a material comprising the following main components (in percentages by weight): 33 to 40% of $SiO_2$, 8 to 16% of $Al_2O_3$, 39 to 44% of CaO, 4 to 9% of MgO and 0.5 to 1.5% of a source of $S^{2-}$ ions.

The customary aggregates used to make concrete, namely sand and/or coarse or fine gravels, generally represent from about 60% to about 80% by weight of the concrete composition, the remainder of the mixture consisting of water.

The concrete according to the invention can also comprise any inert material commonly used in this field, for example fly ash and/or calcareous or siliceous fillers. In this case the amount of inert materials used is between about 5% and about 30% by weight, based on the weight of the blast furnace slag.

According to the invention, the blast furnace slag advantageously has a grain size below about 200 μm, preferably below about 100 μm. It is desirable that this grain size should not be below about 30 μm.

The concrete according to the invention does not set as such. It therefore enables indefinite volumes to be concreted without the risk of defects induced by premature initial setting.

According to the invention, the setting of the concrete is initiated after it has been poured into the trenches.

Thus, according to another feature, the invention relates to a method of initiating the setting of the concrete described above, which consists in activating the blast furnace slag.

BRIEF DESCRIPTION OF THE DRAWINGS

In one embodiment of the invention, shown in FIGS. 1A to 1C, the slag is activated with the aid of an alkaline activating agent using the principle of ion diffusion.

DESCRIPTION OF THE PREFERRED EMBODIMENTS

Figure 1A:
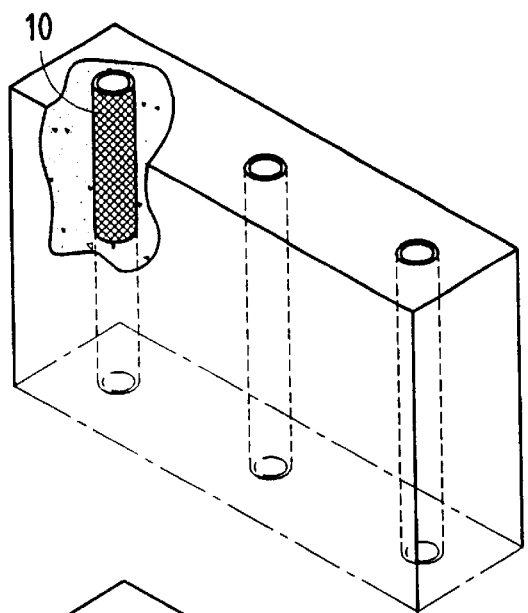
Figure 1B:
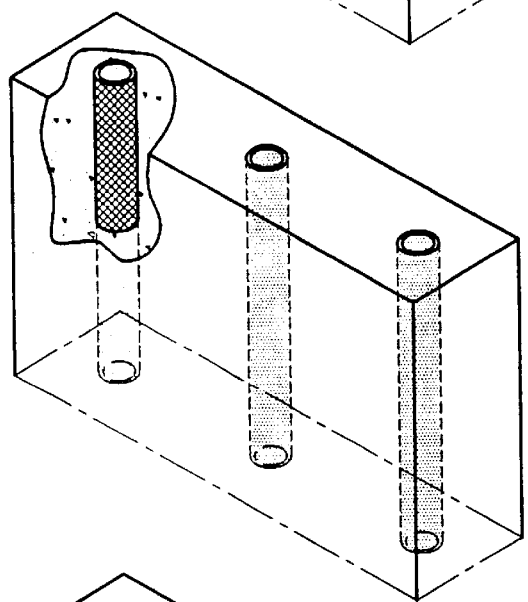
Figure 1C:
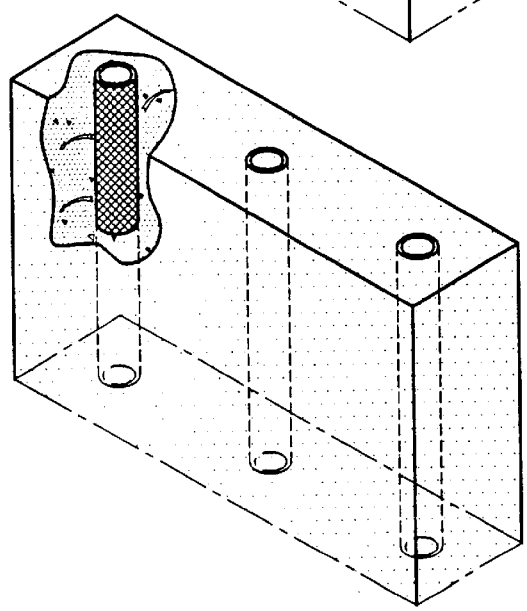

FIG. 1A shows a reinforcing cage equipped with perforated tubes 10 placed about one meter apart. These tubes are covered with a non-woven fabric to prevent the laitance from clogging them. After concreting, these tubes are filled with a solution of an alkaline activating agent such as sodium hydroxide, potassium hydroxide or sodium or potassium carbonate (FIG. 1B). After a few days, the alkaline ions migrate out of the perforated tubes and diffuse into the concrete, activating the blast furnace slag and initiating the setting of the concrete (FIG. 1C).

In this embodiment, it is desirable to use the alkaline agent in an amount such that the final pH of the concrete is brought to a value of between about 12 and about 13.5, preferably to a value of about 12.7.

Figure 2A:
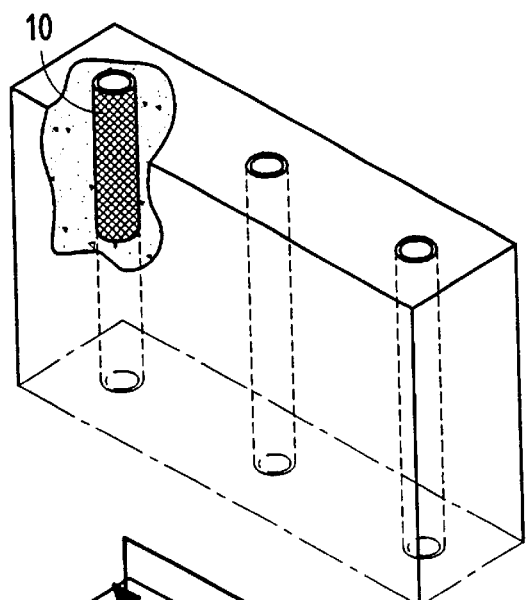
FIGS. 2A and 2C show an alternate embodiment of the invention.
Figure 2B:
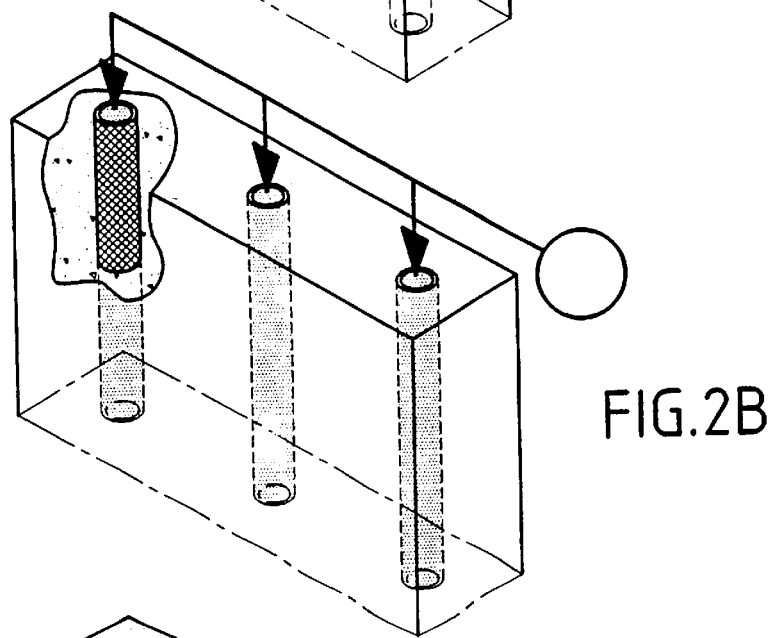
Figure 2C:
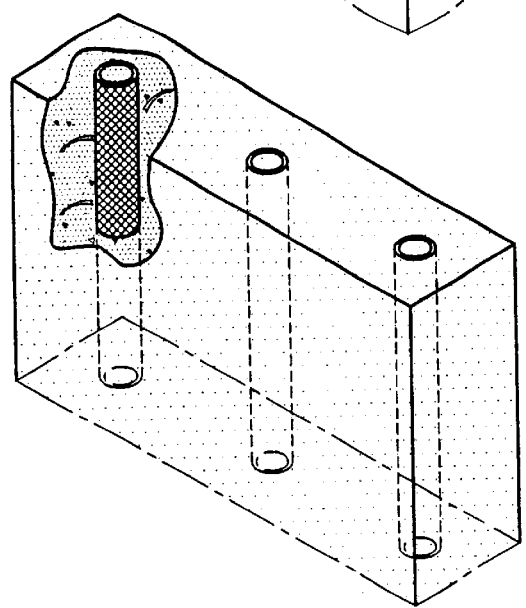

FIGS. 2A to 2C show another embodiment of the invention, which makes it possible to initiate the setting of the concrete more rapidly.

As in the previous embodiment, a reinforcing cage equipped with perforated tubes 10 is used (FIG. 2A). After concreting, an activating agent is injected under pressure (FIG. 2B); it diffuses by percolation into the concrete mass, activates the blast furnace slag and thus initiates the setting of the concrete (FIG. 2C).

Activating agents which can be used are lime-based compounds such as lime itself or hydrated lime (also known as slaked lime). It is also possible to use a sulfate-based compound such as gypsum. A mixed compound (lime-based compound/sulfate-based compound) is also suitable; in this case the weight ratio lime-based compound/sulfate-based compound is generally between about 0.5 and about 1.5.

In this case it is desirable to use the activating agent in an amount of between about 2% and about 15% by weight, based on the weight of the blast furnace slag.

In a variant of the embodiments described above, it is possible to enclose the activating agent in an envelope, especially a soluble envelope, which degrades over time and thereby allows said activating agent to diffuse gradually.

Polyvinyl alcohol films may be mentioned as an example of envelopes which can be used in the method of the invention.

The invention is illustrated by the Example below, which is given purely by way of indication.

EXAMPLE

A concrete of the following composition is prepared:

| | |
|---|---|
| Blast furnace slag | 400 kg |
| Sand 0/5 | 850 kg |
| Fine gravel 5/25 | 900 kg |
| Water | about 200 l |

This concrete does not set; setting can be initiated by one of the methods described above. This concrete does not therefore require the use of adjuvants.

What is claimed is:

1. A pourable delayed-setting concrete which sets only after activation by an initiator, said concrete consisting essentially of blast furnace slag, aggregate and water sufficient to form the pourable concrete, wherein the slag has a $CaO/SiO_2$ weight ratio in the range of from about 1.10 to about 1.35, and wherein the aggregate comprises a mixture of sand and gravels.

2. The concrete of claim 1, wherein the blast furnace slag represents from about 10% to about 35% by weight of the concrete composition.

3. The concrete of claim 1, wherein the blast furnace slag has a grain size below about 200 $\mu$m.

4. The concrete of claim 3, wherein the blast furnace slag has a grain size below about 100 $\mu$m.

5. The concrete of claim 4, wherein the blast furnace slag has a grain size above about 30 $\mu$m.

6. A pourable delayed-setting concrete which sets only after activation by an initiator, said concrete consisting essentially of blast furnace slag, aggregate, water sufficient to form the pourable concrete and an inert material, wherein the slag has a $CaO/SiO_2$ weight ratio in the range of from about 1.10 to about 1.35, and wherein the aggregate comprises a mixture of sand and gravels.

7. The concrete of claim 6, wherein the blast furnace slag represents from about 10% to about 35% by weight of the concrete composition.

8. The concrete of claim 6, the blast furnace slag has a grain size below about 200 $\mu$m.

9. The concrete of claim 8, wherein the blast furnace slag has a grain size below about 100 $\mu$m.

10. The concrete of claim 9, wherein the blast furnace slag has a grain size above about 30 $\mu$m.

11. The concrete of claim 6, wherein the amount of inert material is between about 5% and about 30% by weight, based on the weight of the slag.

\* \* \* \* \*